Oct. 6, 1936. A. H. HOFER Re. 20,126
BRAKE FOR LANDING GEAR WHEELS OF AIRPLANES
Original Filed Sept. 8, 1928
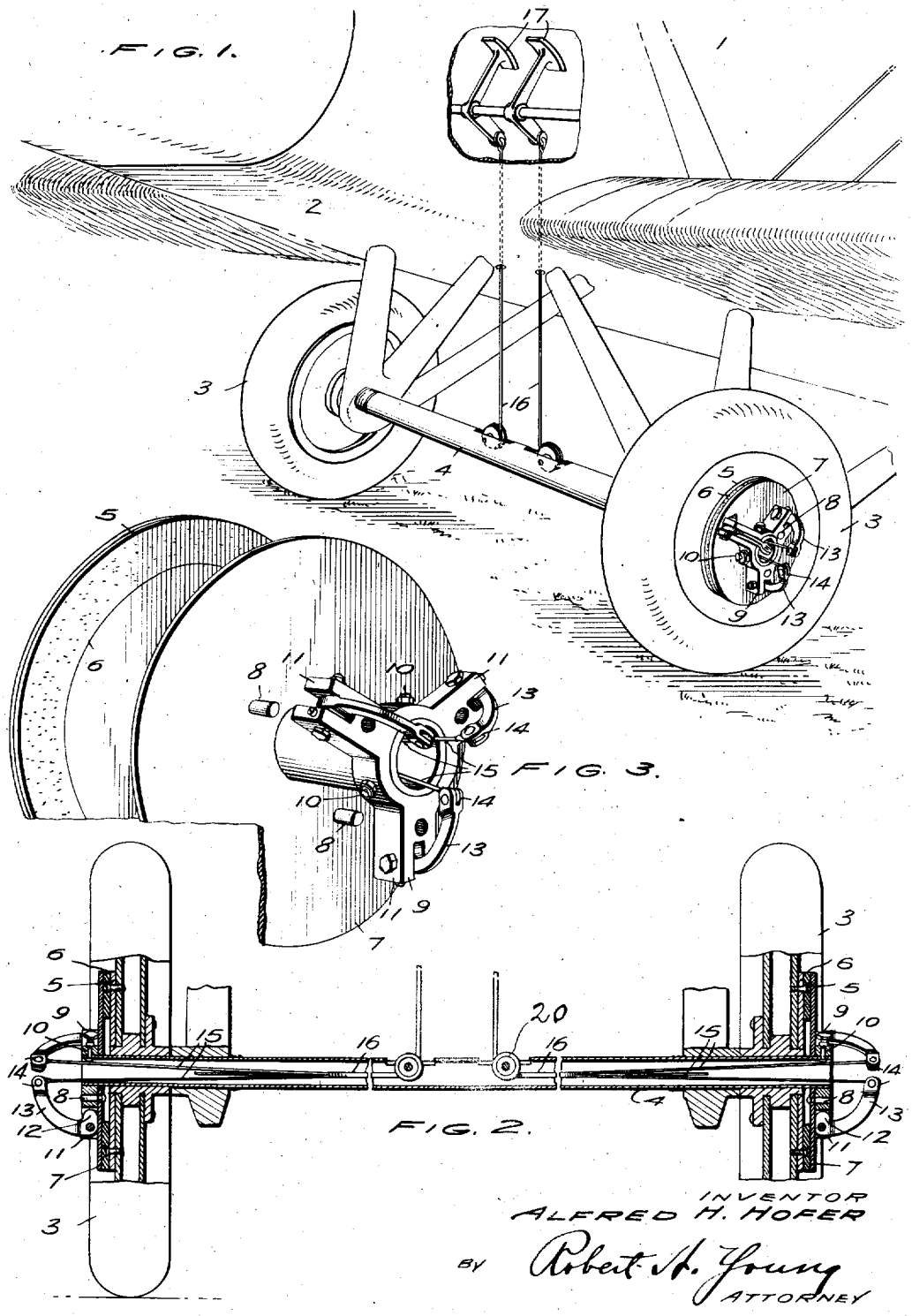
INVENTOR
ALFRED H. HOFER
BY Robert A. Young
ATTORNEY Reissued Oct. 6, 1936

Re. 20,126

UNITED STATES PATENT OFFICE 20,126

BRAKE FOR LANDING GEAR WHEELS OF AIRPLANES

Alfred H. Hofer, Dayton, Ohio, assignor to Bendix Brake Company, Chicago, Ill., a corporation of Illinois Original No. 1,869,479, dated August 2, 1932, Serial No. 304,815, September 8, 1928. Application for reissue June 2, 1934, Serial No. 728,796

9 Claims. (Cl. 188—72)

(Original patent granted under the act of March 3, 1883, as amended April 30, 1928; 370 O. G. 757)

This invention relates to brakes for the wheels of aircraft, and has for its object to provide a simple, safe, and efficient braking mechanism by means of which the movement of the aircraft on the ground may be retarded or stopped, but which may also be employed to guide the aircraft on the ground, either in taking off or alighting, in such manner that the pilot may avoid obstructions in forced landing or is enabled to maneuver the aircraft to any desired position in taking off.

With this object in view, the invention consists of the novel construction of the device and in certain details of construction and combination of parts, all of which will be first fully described and afterwards specifically pointed out in the appended claims.

Referring to the accompanying drawing—

Figure 1 is a perspective view of an airplane of conventional design and illustrating the application of this invention thereto;

Figure 2 is a fragmentary view partly in transverse vertical section through the wheels and axle, and Figure 3 is an enlarged perspective view of the braking mechanism.

Like numerals of reference indicate the same parts throughout the three figures, in which:

1 indicates an airplane, 2 the bottom of the fuselage, 3 the wheels and 4 the hollow axles therefor.

Each of the wheels 3 has, applied on the outside thereof, a disc 5 which may receive a layer or facing of suitable brake-fabric material 6.

Loosely but not rotatably mounted on the axle 4 is a disc 7 complemental to the disc 5. Said complemental disc may have secured thereto a plurality of studs 8 slidably received in suitable holes in the spider 9.

The spider 9 is suitably and non-rotatably secured on the outer end of the axle 4 as by bolts 10, while pivoted in each arm 11 of the spider, is a cam 12 having a curved arm 13 terminating in a clevis 14 which receives an operating cable 15. Each cable 15 leads through the hollow axle 4 and is then connected to a single operating cable 16 extended about supporting shives 20 and thence up through the floor 2 of the fuselage to a foot pedal 17.

The foregoing structure is applied to each wheel of the plane so that independent selective foot pedals for actuating the cables 16 are employed.

Having thus described the invention, its operation is as follows:

When it is desired to retard the movement of a plane on the ground or to bring the same to a full stop, both of the independent selective pedals 17 are depressed. This moves two operating cables 16 and draws their connected cables 15 inwardly of the hollow axles 4. The latter cables 15 being connected to the arms 13 of the cams 12, swing said cams on their pivots in the spider-arms 11. This causes the faces of the cams 12 to act against the disc 7 and force the same inwardly against the disc 5 on the wheel 1. As this action is applied on each of the two wheels, rotation of the same is retarded to any desired degree.

When it is desired to guide the plane on the ground for any reason, pressure applied to either one of the independent selective foot pedals, will exert a retarding action to one wheel only. By this means the plane can be quickly and efficiently guided on the ground for any desired purpose.

Having thus fully described the invention, I do not wish to be understood as limiting myself to the exact construction shown and described, as I have only disclosed a preferred embodiment of my invention, but I consider myself clearly entitled to all such changes or modifications as fall within the limit and scope of the appended claims.

What I claim as new and desire to secure by Letters Patent of the United States is:

1. A device of the character described including the wheels, axle and fuselage of an aircraft, the said wheels being provided with a regular surface on the outsides thereof, a brake-fabric facing on each of said regular surfaces, a complemental disc on each axle and adapted to be moved into engagement with said brake-fabric facings, a spider non-rotatably mounted on each end of said axle, cams pivoted in each of said spiders, operating cables for said cams, independent selective operating mechanism in the fuselage, and means for connecting each set of actuating cables to an independent operating mechanism in the fuselage, the whole arranged in such manner that said independent selective operating mechanisms in the fuselage may be simultaneously manually actuated to retard the rotation of both wheels collectively or they may be manually actuated independently to retard the rotation of the wheels selectively.

2. A device of the character described, including the wheels, axle and fuselage of an aircraft, a disc non-rotatably mounted on each end of said axle and adapted to be moved into engagement with its adjacent wheel, a spider non-rotatably mounted on each end of said axle, cams pivoted in each of said spiders, the faces of said cams acting against the said discs, independent selective manually actuated mechanisms in the said fuselage, and means connecting each set of said cams to an independent operating mechanism, the whole arranged whereby the cams for each wheel may be collectively or selectively manually actuated to retard the rotation of the wheels collectively or selectively.

3. A device of the character described including a hollow axle, a wheel rotatable thereon, a spider non-rotatably mounted on said axle, a disc non-rotatably mounted on said axle, and adapted to be moved into engagement with said wheel, cams pivoted on said spider and engaging said disc and means passing through said hollow axle and connected to said cams for operating said disc to move the same into engagement with said wheel to retard rotation thereof.

4. A device of the character described including a hollow axle, a wheel rotatable thereon, cams non-rotatably mounted with respect to said wheel, a disc non-rotatably mounted between said cams and said wheel, and means passing through said hollow axle and connected to said cams to operate the same and move the said disc into engagement with the wheel to retard rotation thereof.

5. A device of the character described, including a hollow axle, a wheel rotatable thereon, an element non-rotatably mounted adjacent said wheel, cams non-rotatably mounted with respect to said wheel, and means passing through said hollow axle and connected to said cams for operating the same to move the said non-rotatable element into engagement with said wheel to retard the rotation thereof.

6. A device of the character described including a hollow axle, a wheel rotatable thereon, non-rotatable means mounted adjacent to said wheel, and means including a cable passing through said hollow axle for moving said non-rotatable means into engagement with said wheel to retard the rotation thereof.

7. A device of the character described including a hollow axle, a wheel rotatable thereon, nonrotatable means mounted adjacent to said wheel, and means passing through said hollow axle for moving said nonrotatable means into engagement with said wheel to retard the rotation thereof.

8. A device of the character described comprising a wheel, a body associated with said wheel, means comprising a hollow axle supported by said wheel for supporting said body, braking means associated with said wheel, and means passing through said hollow axle for actuating said braking means to retard the rotation of said wheel.

9. A wheel and disc brake, comprising an axle, a wheel journalled thereon, a brake disc carried on one side of said wheel, a friction disc slidable and centered on said axle adapted to frictionally engage said brake disc, means for preventing relative rotation between said disc and axle comprising a collar on said axle, a plurality of spaced longitudinally arranged pins centrally located with respect to the engaging faces of said friction and brake discs and sockets for slidably receiving said pins, a plurality of levers pivoted on said collar and engaging said friction disc at points radially spaced from said pins, and common means for actuating all the levers simultaneously.

ALFRED H. HOFER.